United States Patent
Satoh et al.

(10) Patent No.: US 6,763,245 B1
(45) Date of Patent: Jul. 13, 2004

(54) PORTABLE PHONE DEVICE

(75) Inventors: Noriyoshi Satoh, Kanagawa (JP);
Hidenori Takeuchi, Shizuoka (JP);
Tetsuya Kubo, Kanagawa (JP);
Takefumi Ishida, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/504,404

(22) Filed: Feb. 15, 2000

(30) Foreign Application Priority Data

Feb. 16, 1999 (JP) .............................................. 11-37501

(51) Int. Cl.⁷ ................................................ H04M 1/00
(52) U.S. Cl. ............................... 455/550.1; 455/575.1; 379/433.06
(58) Field of Search ................................. 455/550, 556, 455/412, 566, 575.1; 379/88, 368, 433, 449, 433.06, 433.07

(56) References Cited

U.S. PATENT DOCUMENTS

| | | | |
|---|---|---|---|
| 4,392,181 A | * 7/1983 | Jabben | ........................ 361/761 |
| 4,476,355 A | * 10/1984 | Mital | ......................... 200/5 A |
| 5,235,636 A | 8/1993 | Takagi et al. | |
| 5,357,065 A | 10/1994 | Mitamura et al. | |
| 5,546,457 A | 8/1996 | Tomura et al. | |
| 5,596,487 A | 1/1997 | Castaneda et al. | |
| 5,668,868 A | * 9/1997 | Nordenstrom | .............. 379/447 |
| 5,703,932 A | 12/1997 | Oda | |
| 5,740,543 A | * 4/1998 | Maeda | ......................... 379/75 |
| 5,802,460 A | * 9/1998 | Parvulescu et al. | ......... 455/419 |
| 5,822,703 A | * 10/1998 | Araki | .......................... 455/550 |
| 6,115,618 A | * 9/2000 | Lebby et al. | ........... 379/433.04 |
| 6,196,738 B1 | * 3/2001 | Shimizu et al. | ............. 200/314 |
| 6,263,070 B1 | * 7/2001 | Kubo et al. | ................. 379/368 |
| 6,424,843 B1 | * 7/2002 | Reitmaa et al. | ............. 455/566 |

FOREIGN PATENT DOCUMENTS

| | | |
|---|---|---|
| BE | 1011293 A3 | 6/1999 |
| CN | 1146681 A | 9/1995 |
| EP | 0 851 648 A2 | 7/1998 |
| EP | 0 913 976 A2 | 5/1999 |
| GB | 2 158 290 A | 11/1985 |
| JP | 3-42997 | 2/1991 |
| JP | 5236075 | 9/1993 |
| JP | 5-236075 | 9/1993 |
| WO | WO 93/12604 | 6/1993 |

* cited by examiner

Primary Examiner—Marsha D. Banks-Harold
Assistant Examiner—James K. Moore
(74) Attorney, Agent, or Firm—Pearne & Gordon LLP

(57) ABSTRACT

In a housing comprising an upper case and a lower case are stored a whip antenna, a built-in antenna, a receiver for outputting a voice, a display part for indicating characters and marks, a back side key to be operated during the call, a flexible substrate comprising a diaphragm switch, a printed board, and a shield case for shielding a receiving circuit part and a radio circuit part. In the case the user would like to keep the content of the conversation during the call, the back side key can be operated by a finger. Accordingly, the diaphragm switch is turned on so as to drive a recording mechanism.

8 Claims, 4 Drawing Sheets

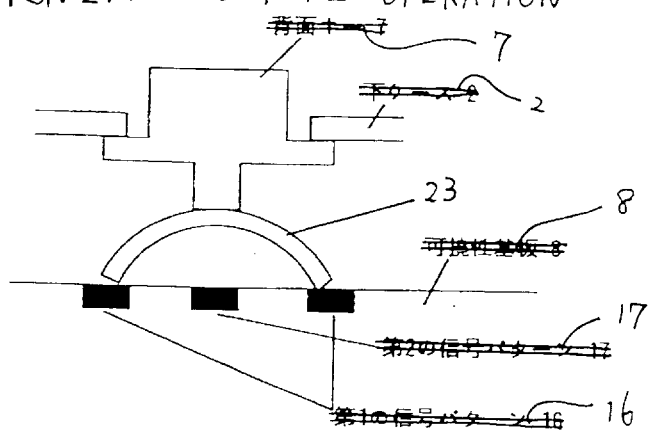
FIG. 2A BEFORE OPERATION
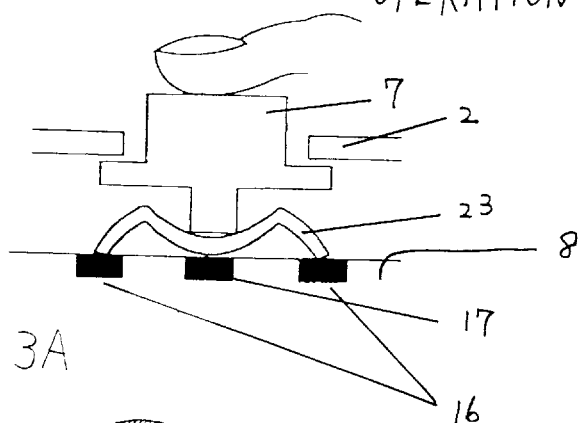
FIG. 2B DURING OPERATION
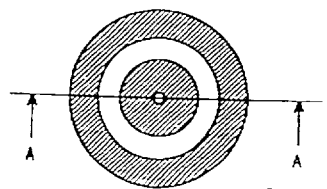
FIG. 3A
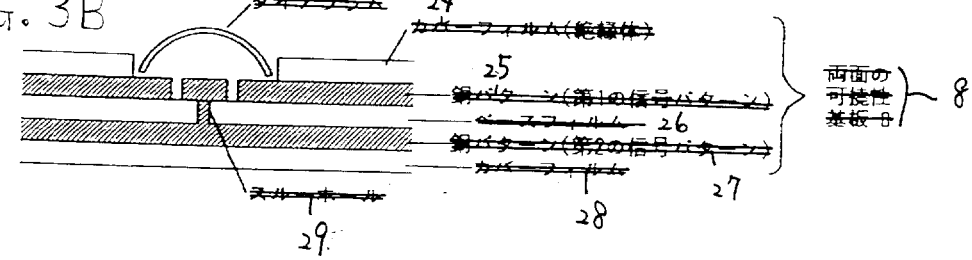
FIG. 3B

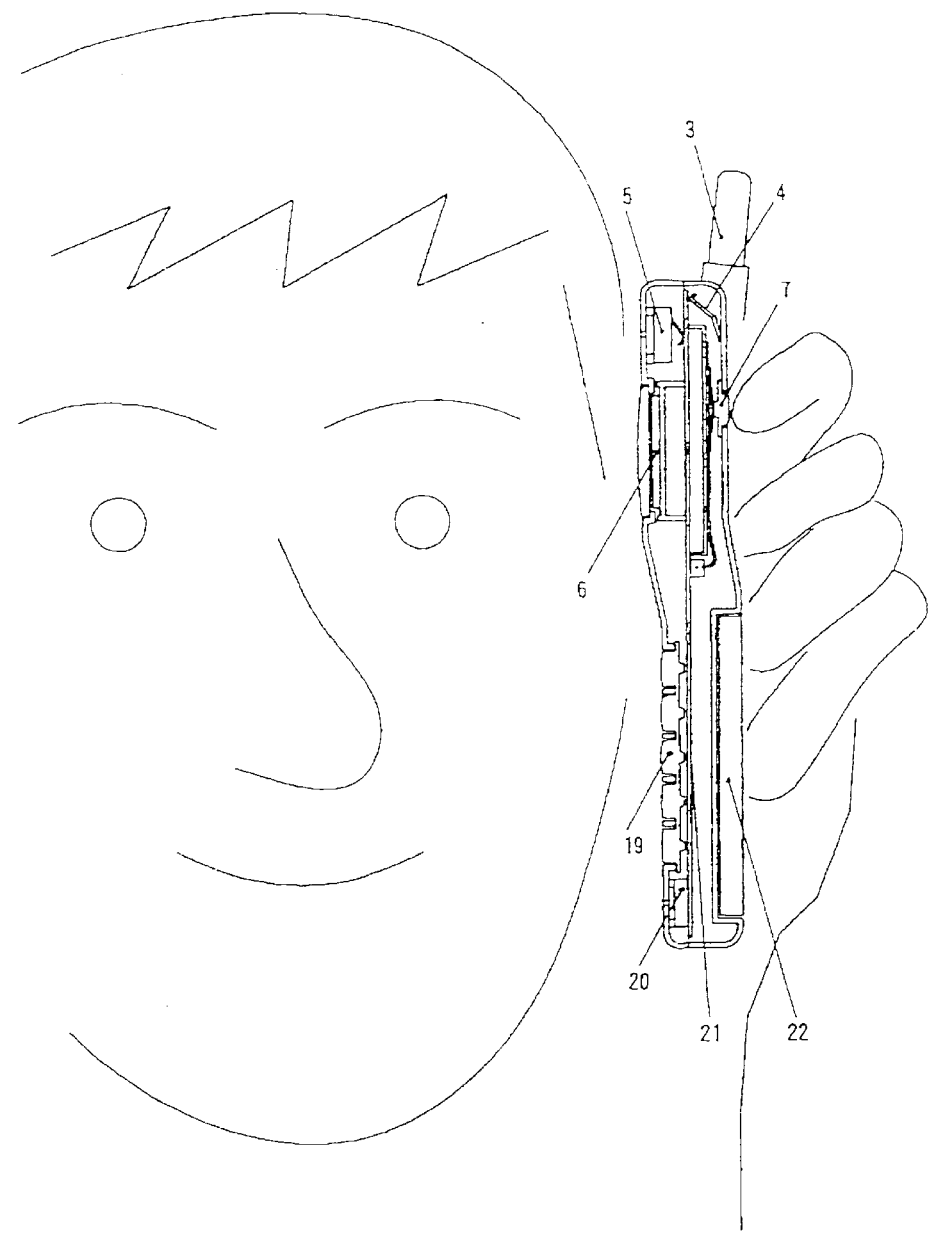

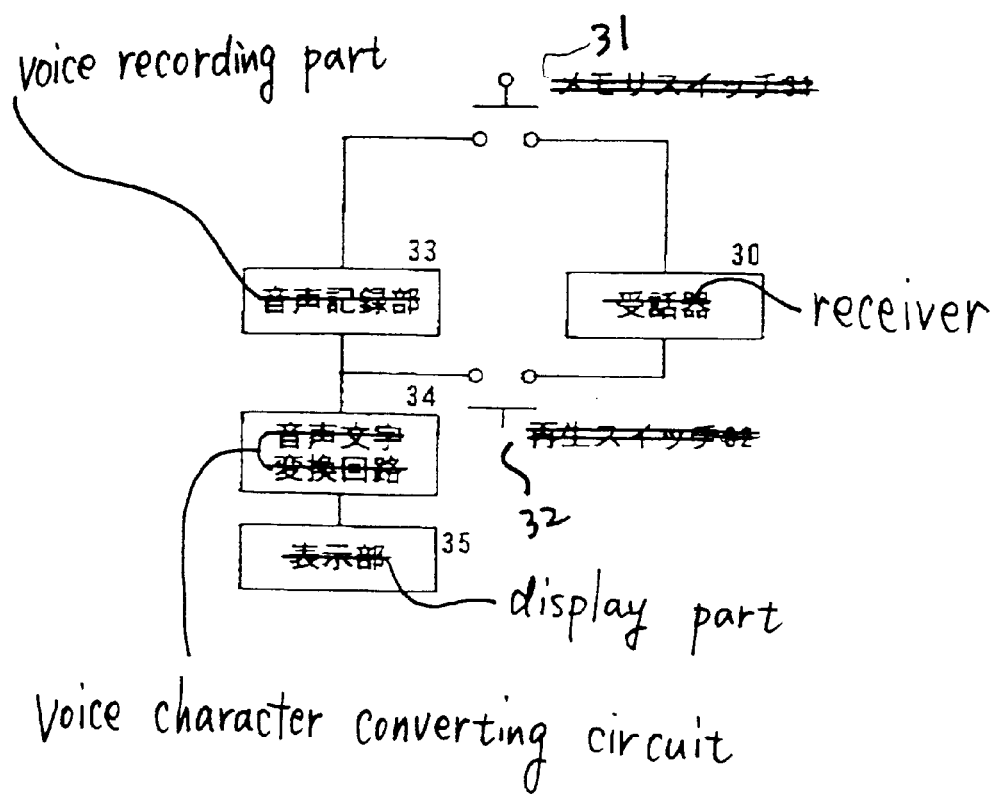

PORTABLE PHONE DEVICE

BACKGROUND OF THE INVENTION

The present invention relates to a portable phone device, more specifically, it relates to that comprising a back side key for executing an operation concerning the function of the portable phone during a call on the surface of the back side case of the receiver.

Conventionally, for example, JP-A-Hei.3-42997 discloses a cordless phone device comprising an operation part for remote control of the other electronic parts at a position independent from a handset phone operation part.

The cordless phone device comprises the handset phone operation part as well as the operation part for remote control having a function different from that of the handset phone operation part in the same housing so that a controller dedicated for remote control can be eliminated.

Moreover, conventionally, for example, JP-A-Hei.5-236075 discloses a phone device capable of recording a part of the conversation as a memorandum of the call by the use of a memorandum switch provided at a position in the receiver easily operable by the grasping hand (specifically a side part of the receiver).

FIG. 5 shows a circuit configuration of the conventional handset phone capable of taking a memorandum of the content of the call. In FIG. 5, a memorandum switch 31 is provided at a position in a receiver 30 easily operable by the grasping hand (specifically a side part of the receiver) so as to be operated for recording a part of the conversation as a memorandum of the call in a voice recording part 33. Moreover, a reproduction switch 32 is provided for reproducing and hearing the content of the record from the receiver 30. Furthermore, the reproduced voice is converted into characters by a voice character converting circuit 34 so that the converted characters are displayed at a display part 35 as needed.

Since the recent portable phones are small and lightweight, a remote control operation part independent from the phone device, realized in the cordless phone device, cannot be stored in a housing due to the limitation of the space, and thus how functions concerning the phone device can be added in consideration of the space of the portable phone has been a large problem.

Moreover, since the small and lightweight portable phones are operated by gently placing a finger, a problem arises in that an extra space is not available for providing two switches for memorandum and reproduction at a position operable by the grasping hand (specifically a side part of the receiver) unlike the handset phone.

SUMMARY OF THE INVENTION

Accordingly, an object of the invention is to provide a portable phone device comprising a back side key for executing an operation concerning the function of the portable phone during a call on the surface of the back side case of the receiver.

[Means for Solving the Problems]

In order to achieve the object, a first aspect of a portable phone device of the invention comprises a back side key for executing an operation concerning the function of the portable phone during a call on the surface of the back side case of the receiver.

According to the first aspect of the invention, the operation concerning the function of the portable phone can be executed during the call.

Moreover, a second aspect of a portable phone device is the portable phone device according to the first aspect, wherein the back side key is to be operated during the call for starting recording of the content of the call or for starting reproduction of the recorded content of the call.

According to the second aspect, recording of the content of the call can be started or reproduction of the recorded content of the call can be started by the operation during the call.

Furthermore, a third aspect of a portable phone device is the portable phone device according to the first aspect, wherein the back side key is contacted with a diaphragm provided on the back side of a shield case.

According to the third aspect, drop-off of the back side key can be prevented owing to the contact with the diaphragm.

Moreover, a fourth aspect of a portable phone device is the portable phone device according to the third aspect, wherein a flexible substrate comprising a diaphragm switch for providing a switch by contacting with the diaphragm is mounted in the shield case.

According to the fourth aspect, a flexible substrate comprising a diaphragm switch can be mounted on the shield case.

BRIEF DESCRIPTION OF THE DRAWINGS

FIG. 2A is a diagram showing the state before operating a back side key according to the embodiment of the invention; and FIG. 2B is a diagram showing the state after operating the back side key according to the embodiment of the invention.

FIG. 3A is a plan view showing a wiring pattern of a flexible substrate to be provided with a diaphragm switch according to the embodiment of the invention; and FIG. 3B is a partial cross-sectional view showing the configuration of the flexible substrate comprising a diaphragm and the diaphragm switch for providing a switch by contacting with the diaphragm according to the embodiment of the invention.

FIG. 4 is a diagram showing an example of the use of the portable phone device according to the embodiment of the invention.

FIG. 5 is a chart showing an example of the use in the case recording of the content of the call is started or reproduction of the recorded content of the call is started in a conventional portable phone device.

DETAILED DESCRIPTION OF THE PREFERRED EMBODIMENT

Figure 1:
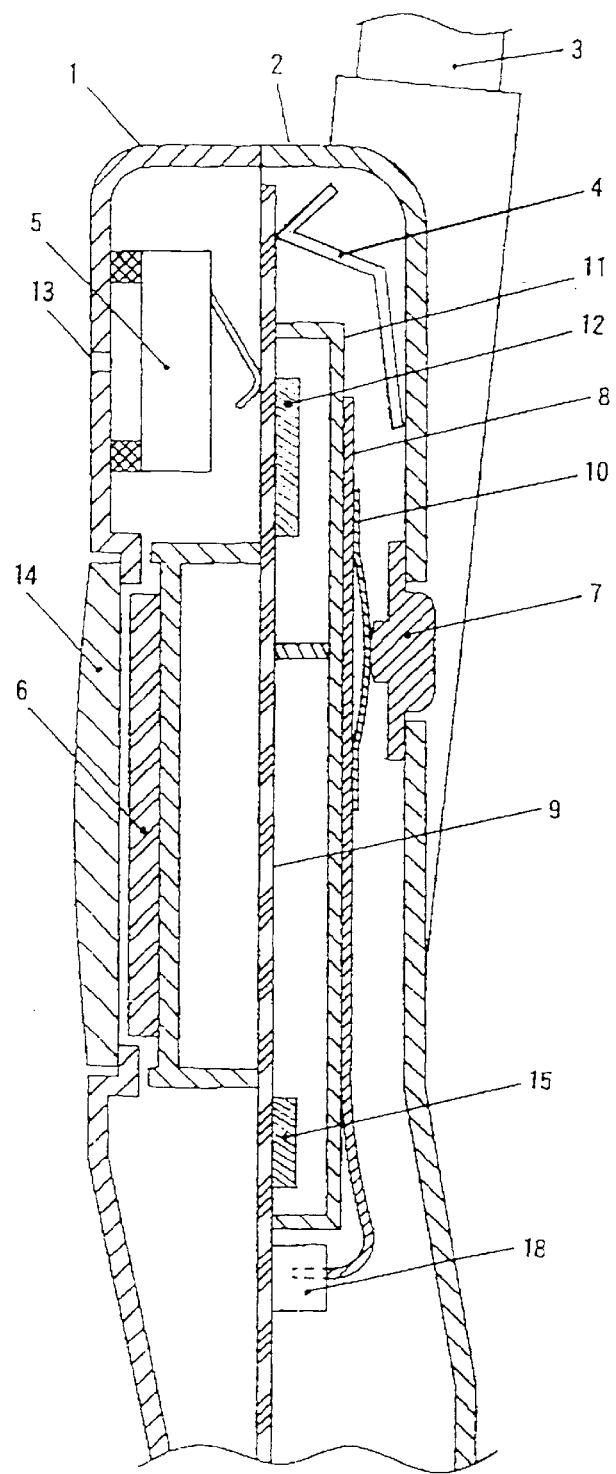
FIG. 1 is a vertical side cross-sectional view showing the configuration of a portable phone device according to an embodiment of the invention.

Hereinafter an embodiment of the invention will be explained with reference to drawings. FIG. 1 is a vertical side cross-sectional view showing the configuration of a portable phone device according to an embodiment of the invention.

In FIG. 1, in a housing comprising an upper case 1 and a lower case 2 are stored a whip antenna 3, a built-in antenna 4, a receiver 5 for outputting a voice, a display part 6 for indicating characters and marks, a back side key 7 to be operated during the call, a flexible substrate 8 comprising a diaphragm switch 10, a printed board 9, and a shield case 11 for shielding a receiving circuit part 12 and a radio circuit part 15.

A sound hole 13 for introducing a generated voice from the receiver 5 to outside the housing is provided in the upper case 1. Moreover, a transparent window 14 is provided in the display part 6 so that characters and marks displayed on the display part 6 can be recognized and perceived by the user.

An oscillator for controlling the oscillating frequency by the voltage (VCO), a plurality of resistors and capacitors are mounted so as to form the receiving circuit part 12 with a low noise amplifier and a first mixer, and moreover, a temperature compensating type crystal oscillator (TCXO), a plurality of resistors and capacitors are surface mounted so as to form the radio circuit part 15 on the rear side of the printed board 9. The receiving circuit part 12 and the radio circuit part 15 are covered by the resin shield case 11 for preventing the entrance of an electromagnetic wave from the outside.

The shield case 11 is made from a resin material such as acrylonitrile-butadiene-styrene, with the surface applied with an electroless copper plating for preventing passage of an electromagnetic wave. Furthermore, an electroless nickel plating is applied on the surface thereof as the corrosion preventing treatment for the electroless copper plating. Moreover, a rib is provided upright contacting with the printed board 9 inside the shield case 11 at the opposite side with respect to the back side key 7 for preventing deformation of the shield case 11 when the back side key 7 is pressed by a finger.

The configuration of the back side key 7 and the diaphragm 23 will be explained with reference to FIGS. 2A to 3B. FIGS. 2A and 2B are diagrams 23 showing the states before and after operating the back side key 7 according to an embodiment of the invention, and FIGS. 3A and 3B are a plan view and a partial cross-sectional view showing the configuration of a flexible substrate for mounting a diaphragm switch comprising a switch 10 according to the contact with a diaphragm 23.

In FIG. 2A, in the state before operating the back side key 7, the back side key 7 is contacted with the diaphragm 23, with the lower case 2 and the back side key 7 closely contacted with each other according to the pressure from the diaphragm 23. Moreover, a first signal pattern 16 and a second signal pattern 17 are provided in the flexible substrate 8 supporting the diaphragm switch 10.

In contrast, as shown in FIG. 2B, after the operation, the center part of the diaphragm 23 is deflected owing to the pressure by the back side key 7 so that the center part comes in contact with the second signal pattern 17 for executing the switching operation.

FIG. 3A shows the first and second signal patterns shown in FIGS. 2A and 2B seen from above. The first signal pattern 16 is a doughnut-like pattern, and the second signal pattern 17 is a round pattern having a through hole 29 in the center thereof.

FIG. 3B is a partial cross-sectional view showing the state that the signal patterns of FIG. 3A are provided in the flexible substrate 8. The flexible substrate 8 comprises from below a cover film 28, a copper pattern 27 linked with the second signal pattern 17 by the through hole 29, a base film 26, a copper pattern 25 comprising the first signal pattern 16, and a cover film 24 made of an insulating material (such as polyimide), surrounding the diaphragm 23 with a round shape.

A conductor pattern to be connected with a connector 18 is provided in the lower side cover film 28 of FIG. 3B at the end part of the flexible substrate 8 opposite to the diaphragm side so as to be electrically connected with the printed board 9 (see FIG. 1).

The operation of the back side key 7 and the diaphragm 27 will be explained with reference to FIGS. 2A to 3B. In the case the back side key 7 is pressed in FIG. 2A, a center part of the diaphragm 23 is deformed elastically so as to be in the state shown in FIG. 2B, with the first and second signal patterns 16, 17 short-circuited via the diaphragm 23 (metal). Accordingly, the switch is turned on.

In the case the switch is turned off, the back side key 7 returns to be in the original state owing to the elasticity of the diaphragm 23 as shown in FIG. 2A so as to be in the state awaiting the operation of the back side key.

FIG. 4 is a diagram showing an example of the use of the portable phone device having the above-mentioned configuration. In FIG. 4, the user can use the portable phone device like the conventional ones, but in the case he or she would like to keep the content of the conversation during the call, he or she can operate the back side key 7 with a finger. Accordingly, the diaphragm switch 10 is turned on so as to drive the recording mechanism.

In this case, since the extra space for mounting a mechanical recording mechanism is not available in the housing of the portable phone as mentioned above, the content of the conversation is recorded by a method of using an electronic recording mechanism, such as an IC memory.

FIG. 4 also shows an operation part 19, a transceiver 20, a control part 21 and a battery part 22, which are not shown as the configuration of the portable phone in FIG. 1.

Accordingly, in the invention, the back side key 7 is provided at the opposite side with respect to the receiver, and furthermore, the diaphragm switch is provided on the shield case 11 covering the radio part formed on the rear surface of the printed substrate 9 without superimposing on the built-in antenna 4 dedicated for receipt so that the diaphragm switch can be operated from the outside of the housing. The diaphragm switch 10 is movable toward the receiver side according to the operation of the back side key 7 so that the force is applied to the phone in the direction that the receiver is forced against the user's ear. Therefore, the situation wherein the receiver is away from the ear during the conversation so as to disturb hearing can be avoided.

Moreover, the battery part 22 is provided on the back surface of the receiver for supplying the power source to the main body. Since the rear surface has no key for operating the device so as not to be operated mistakenly during the use, in general, the battery part 22 is grasped by the user. In the case the above-mentioned function is to be used, the back side key 7 can be operated by the index finger.

Furthermore, since the built-in antenna 4 is not superimposed as mentioned above, the finger operating the back side key 7 does not cover the built-in antenna 4, and thus the receiving sensitivity is not deteriorated. That is, in the case the built-in antenna 4 is covered with a finger, since the human body is grounded, the built-in antenna 4 is covered with the ground, and thus the receiving sensitivity is deteriorated. Such inconvenient situation can be avoided herein.

Moreover, according to the invention, the effect of starting recording of the content of the call or starting reproduction of the recorded content of the call can be achieved by pushing only the back side key 7. If the call is recorded in voice recording part, the content of the call is reproduced by pushing the back side key 7. If the call is not recorded in voice recording part, the content of the call is recorded by pushing the backside key 7.

As is apparent from the explanation given above, since a portable phone device of the invention comprises a back side key for executing an operation concerning the function of the portable phone during a call on the surface of the back side case of the receiver, the effect of executing the operation concerning the function of the portable phone during the call can be achieved.

Moreover, since a portable phone device of the invention is the above-mentioned portable phone device, wherein the back side key is to be operated during the call for starting recording of the content of the call or for starting reproduction of the recorded content of the call, the effect of starting recording of the content of the call or reproduction of the recorded content of the call can be achieved by the operation during the call.

Furthermore, since a portable phone device of the invention is the above-mentioned portable phone device, wherein the back side key is contacted with a diaphragm provided on the back side of a shield case, the effect of preventing drop-off of the back side key can be achieved owing to the contact with the diaphragm.

Moreover, since a portable phone device of the invention is the above-mentioned portable phone device, wherein a flexible substrate comprising a diaphragm switch for providing a switch by contacting with the diaphragm is mounted in the shield case, the effect of mounting a flexible substrate comprising a diaphragm switch on the shield case can be achieved.

Furthermore, this kind of devices are provided with a circuit part, which requires an electromagnetic shield. Since the key and the switch for executing operations are provided on the shield case 11 covering the circuit part in the embodiment of the invention, the effect of providing the key and the switch having a function operable during the call without narrowing the mounting area or enlarging the device can be achieved.

What is claimed is:

1. A portable phone device comprising:
   a housing with an upper case and a lower case,
   a printed board located within the housing,
   a shield case mounted on the printed board,
   a back side key provided on a back surface of the portable phone for executing an operation concerning a function of the portable phone during a call,
   a diaphragm provided on the back side of the shield case in contact with the back side key, and
   a rib contacting with the printed board on an inside side of the shield case at an opposite side with respect to the back side key for preventing deformation of the shield case when the back side key is pressed.

2. The portable phone device according to claim 1, wherein the key is located generally opposite a receiver sound hole of the phone such that operating the key forces the receiver against a user's ear.

3. The portable phone device according to claim 1, wherein the key is located on an upper portion of the phone.

4. The portable phone device according to claim 1, wherein said function is one of starting recording of the content of the call and starting reproduction of the recorded content of the call.

5. A portable phone device comprising:
   a housing with an upper case and a lower case,
   a printed board located within the housing,
   a shield case mounted on the printed board,
   a back side key provided on a back surface of the portable Phone for executing an operation concerning a function of the portable phone during a call,
   a diaphragm provided on the back side of the shield case in contact with the back side key, and
   a flexible substrate mounted on the shield case comprising a diaphragm switch for providing a switch by contacting with the diaphragm.

6. The portable phone device according to claim 5, wherein a first signal pattern and a second signal pattern are provided in the flexible substrate, wherein the diaphragm contacts the first signal pattern when in an undeflected state and the diaphragm comes in contact with the second signal pattern when in a deflected state.

7. The portable phone device according to claim 6, wherein the first signal pattern is a doughnut-like pattern, and the second signal pattern is a round pattern having a through hole in the center thereof.

8. The portable phone device according to claim 6, wherein the flexible substrate further comprises a first cover film below a first contact pattern, the first contact pattern linked with the second signal pattern by a through hole, a base film located between the first contact pattern and a second contact pattern, the second contact patten comprising the first signal pattern, and a second cover film made of an insulating material.

* * * * *